US00RE38366E

(19) United States
(12) Reissued Patent
Kenton

(10) Patent Number: US RE38,366 E
(45) Date of Reissued Patent: Dec. 30, 2003

(54) OIL RE-REFINING METHOD AND APPARATUS

(75) Inventor: Kalevi John Kenton, London (GB)

(73) Assignee: Avista Resources, Inc., Houston, TX (US)

(21) Appl. No.: 09/665,554

(22) Filed: Sep. 19, 2000

Related U.S. Patent Documents

Reissue of:
(64) Patent No.: 5,814,207
Issued: Sep. 29, 1998
Appl. No.: 08/664,232
Filed: Jun. 7, 1996

U.S. Applications:
(63) Continuation of application No. 09/404,501, filed on Sep. 23, 1999, now abandoned.

(30) Foreign Application Priority Data

Jun. 8, 1995 (GB) ..... 9511616

(51) Int. Cl.[7] ..... C10M 175/00; B01D 1/00; B01D 1/14

(52) U.S. Cl. ..... 208/184; 208/179; 208/352; 208/357; 208/361; 208/366; 196/102; 196/105; 196/114; 196/127; 196/132; 196/139; 196/141

(58) Field of Search ..... 208/179, 184, 208/352, 357, 361, 366; 159/17.1, DIG. 16; 196/102, 105, 114, 127, 132, 139, 141; 202/178

(56) References Cited

U.S. PATENT DOCUMENTS

| | | | | | |
|---|---|---|---|---|---|
| 3,788,044 | A | * | 1/1974 | McNeil | 55/204 |
| 4,101,414 | A | * | 7/1978 | Kim et al. | 208/18 |
| 4,131,538 | A | * | 12/1978 | Rose et al. | 208/352 |
| 4,140,212 | A | * | 2/1979 | O'Blasny et al. | 196/114 |
| 4,360,420 | A | * | 11/1982 | Fletcher et al. | 208/184 |
| 4,375,386 | A | * | 3/1983 | Windham | 159/31 |
| 4,731,164 | A | * | 3/1988 | Williamson | 202/173 |
| 4,770,747 | A | * | 9/1988 | Muller | 202/176 |
| 4,834,868 | A | * | 5/1989 | Lappin | 208/184 |
| 4,904,347 | A | * | 2/1990 | Cros et al. | 203/73 |
| 4,941,330 | A | * | 7/1990 | Williamson | 62/515 |
| 5,632,867 | A | * | 5/1997 | Davis et al. | 203/78 |

FOREIGN PATENT DOCUMENTS

| | | | |
|---|---|---|---|
| GB | 95 11 616 | * | 6/1995 |
| WO | WO-91/17804 | * | 11/1991 |
| WO | WO-92/15659 | * | 9/1992 |

* cited by examiner

*Primary Examiner*—Walter D. Griffin
(74) *Attorney, Agent, or Firm*—Moser, Patterson & Sheridan

(57) ABSTRACT

A method and apparatus for re-refining used oil, in which the used oil is processed in at least one cyclonic vacuum evaporator comprising a void evaporation chamber (4) into which feedstock is tangentially injected, and in which a fraction of the feedstock is condensed in a spray condenser (7) communicating with the evaporation chamber (4).

18 Claims, 4 Drawing Sheets

OIL RE-REFINING METHOD AND APPARATUS

Matter enclosed in heavy brackets [ ] appears in the original patent but forms no part of this reissue specification; matter printed in italics indicates the additions made by reissue.

*CROSS-REFERENCE TO RELATED APPLICATION*

*This application is a continuation of application Ser. No. 09/404,501, filed Sep. 23, 1999 abandoned.*

This invention relates to the re-refining of used oils, and in particular to the use of a multi-stage distillation process incorporating cyclonic evaporators to reclaim useful oil fractions from used oil.

Each year, about 20 million tons (150 million barrels) of used lubricating oils, such as automotive lubricating oils, gear oils, turbine oils and hydraulic oils which through usage or handling have become unfit for their intended use, are generated world-wide. Used oil accumulates in thousands of petrol stations, repair shops and industrial plant, derived from millions of cars and other machines. Lubricating oil does not wear out during use, but does become contaminated with heavy metals, water, fuel, carbon particles and degraded additives. Eventually the lubricating oil is so contaminated that it can not satisfactorily perform its lubricating function and must therefore be replaced. In addition, large amounts of other used oils, such as marine slops, tank bottoms, pipeline interface products and other contaminated mineral oil products are generated. Most of this used oil is dumped (legally or illegally) or burned as low-grade fuel, but such methods of disposal are highly detrimental to the environment and can cause serious pollution. Public opinion and legislature is increasingly demanding the material recycling, rather than the burning or dumping, of waste products. Used lubricating oil may contain 60 to 80% highly valuable base oil (generally comprising mineral oil fractions with a viscosity of not less than 20 cSt at 20' C.), worth significantly more than heavy fuel oil. It is therefore desirable to extract and reuse this base oil.

To date, however, this has not generally been undertaken by the refiners of crude oil. This is because, although used oil represents a sizable raw material source for re-refining, its volume is relatively small in relation to the world's crude oil requirements, which currently exceed 9 million tonnes (65 million barrels) a day. In addition, used oil is contaminated by impurities which can cause expensive disruption and downtime in conventional large crude oil refineries. Furthermore, since used oil does not generally originate from one source in large volumes its collection and handling require resources which are incompatible with the normal raw material logistics of large oil companies.

It has been known since the early 1900s that used lubricating oil from engines and machinery can be recycled. This recycling grew and developed with the popularization of the automobile. During the Second World War, re-refining became more widespread due to the difficulties in supplying virgin lubricating oil. Used oil re-refining still continued in the 1960s and 1970s, but then became uneconomical. This was because the conventional re-refining processes at that time involved the addition of sulphuric acid in order to separate the contaminants from the useful hydrocarbon components of the used oil, thereby generating as a waste product a highly toxic acid sludge. With the increased use of performance-enhancing oil additives towards the end of the 1970s, the amount of acid sludge generated by conventional re-refining plant grew to an unacceptable level. In the United States of America, it has been reported by the American Petroleum Institute that, as a consequence of legislation against the landfilling of acid sludge generated by conventional plant, the number of used oil re-refining plant has dropped from 160 in the 1960s to only three today.

As an alternative to the acid treatment process for the re-refining of used oil, various evaporation/condensation processes have been proposed. In an attempt to obtain high operating efficiency, it is generally suggested that thin film evaporators be used. These evaporators include a rotating mechanism inside the evaporator vessel which creates a high turbulence and thereby reduces the residence time of feedstock oil in the evaporator. This is done in order to reduce coking, which is caused by cracking of the hydrocarbons due to impurities in the used oil. Cracking starts to occur when the temperature of the feedstock oil rises above 300° C., worsening significantly above 360° to 370° C. However, any coking which does occur will foul the rotating mechanism and other labyrinthine mechanisms such as the tube-type heat exchangers which are often found in thin film evaporators. These must therefore be cleaned regularly, which leads to considerable downtime owing to the intricate structure of the mechanisms.

It is known from WO-91/17804 to provide an evaporator which may be used in the re-refining of used oil by distillation. This evaporator comprises a cyclonic vacuum evaporator in which superheated liquid is injected tangentially into a partially evacuated and generally cylindrical vessel. The inside of the vessel is provided with a number of concentric cones stacked on top of one another which serve to provide a reflux action. As a result of coking, however, the evaporator still needs to be shut down periodically in order to undertake the intricate and time-consuming task of cleaning the cones.

According to a first aspect of the present invention, there is provided a method of re-refining used oil wherein the used oil is processed in at least one cyclonic vacuum evaporator comprising a substantially void evaporation chamber into which feedstock is substantially tangentially injected, and wherein a fraction of the feedstock is condensed in a spray condenser communicating with the evaporation chamber.

According to a second aspect of the present invention, there is provided a cyclonic vacuum evaporator provided with temperature and pressure control and comprising a substantially void evaporation chamber into which, in use, feedstock is substantially tangentially injected, and a spray condenser in communication with the evaporation chamber in which a distillate may be obtained.

Since the evaporator is arranged so that, in use, feedstock is injected substantially tangentially into a partial vacuum, a degree of flash evaporation of the feedstock will occur and a turbulent cyclonic flow of the liquid and vapour phases will be achieved. The liquid phase will tend to drop to the bottom of the evaporation chamber while the vapour phase will tend to rise to the top of the chamber. A predetermined fraction of the vapour phase is then condensed in the spray condenser, while the rest of the vapour phase is extracted from the evaporation chamber. Since the evaporation chamber is substantially free of moving parts and/or labyrinthine structures, any coking which may occur will tend to be on the inner walls of the evaporation chamber. Due to the turbulent cyclonic conditions in the evaporator, grit present in the feedstock helps to dislodge coking from the fouled surfaces. Even if coking becomes severe, it is relatively quick and simple to open the evaporator chamber and clean the interior walls, thereby avoiding long downtimes. The use of a spray condenser in this aspect of the present invention also helps to reduce coking, since the conventional labyrinthine tube-type heat exchanger system of conventional thin film evaporators is not required. In general, the spray condenser is positioned above the evaporation chamber. Since the distillate obtained in a spray condenser does not have to condense onto a metal surface, coking is further reduced.

Advantageously, the evaporator is provided with a feedstock recirculation system in which the product collected at the bottom of the evaporation chamber is recirculated to the evaporation chamber by way of a pump and a heater. The heater heats the recirculating feedstock to a higher temperature than the original feedstock, and the pump is advantageously arranged so that the flow of the recirculating feedstock through the recirculation system is greater than the flow of the original feedstock through the initial introduction pipes. The flow in the pipes and the heat exchangers is preferably kept well turbulent in order to reduce the likelihood of coking; this is achieved by keeping the fluid velocity in the pipes relatively high. Advantageously, the flow rate over the heat exchanger, and therefore the temperature differential ($\Delta T$) over the heater, is kept low. This helps to avoid overheating of the used oil, and thereby reduces coking in the distillation system. In preferred embodiments, a proportion of the recirculating feedstock may be tapped off for further processing.

Advantageously, the spray condenser operates on a reflux principle, in which distillate obtained in the spray condenser is recirculated by way of a pump and a heat exchanger. By controlling the temperature conditions in the spray condenser recirculation system in conjunction with the temperature and pressure in the spray condenser itself, the nature of the fraction distilled can be accurately controlled. A proportion of this distillate may be tapped from the recirculation system and fed to storage.

Further fractions may be condensed from the vapour phase which is generated in the evaporation chamber and which passes through the spray condenser. This may be achieved by means of one or more heat exchanger circuits in which the fractions are condensed and from where they may be fed to storage. By way of condensation of the lighter fractions in the vapour line, an improved vacuum can be maintained so as to reduce the work required of the general vacuum system by which the pressure in the evaporation chamber is controlled. The remaining vapour phase is drawn into the vacuum system and any vapour which does not condense in the vacuum system may then be scrubbed and fed away for incineration or other suitable disposal.

According to a third aspect of the present invention, there is provided a plant suitable for re-refining used oil, the plant comprising at least two cyclonic vacuum evaporators each provided with temperature and pressure control and each comprising a substantially void evaporation chamber into which, in use, feedstock is substantially tangentially injected, and each being provided with a spray condenser in communication with the evaporation chamber in which spray condenser a distillate may be collected, wherein the evaporators are linked together such that feedstock which has been processed in a first evaporator may be passed as feedstock to the at least one other evaporator for further processing.

By connecting two or more evaporators together in series, a multi-stage distillation plant can be constructed in order continuously to extract and separate several valuable base oil fractions. This has the further advantage that a higher vacuum can be maintained in the later evaporator stages, as the distillate fractions become progressively heavier, since the heavier oil fractions generate less vapour volume than the lighter fractions. Advantageously, each evaporator independently has its temperature and pressure conditions determined and applied, thereby enabling a relatively wide range of fractions (at least two per evaporator) to be extracted from the used oil. The temperature and pressure conditions, once set, are preferably kept substantially constant in order to provide product consistency over time. The temperature and pressure conditions may be individually reset in order to obtain alternative oil fractions. This provides a further advantage over the prior art since it also allows the system to be tailored to varying qualities and compositions of feedstock.

Each evaporator and its associated ancillary apparatus may advantageously be mounted in a frame so as to form a modular unit. Input and output to each modular unit is arranged so that two or more of such modular units may be interconnected in a simple manner, thereby enabling a plant to be constructed merely by fitting together a predetermined number of modular units.

In a preferred embodiment, the plant comprises four evaporators connected to one another in series. Feedstock used oil is first filtered to remove particles and contaminants above a predetermined size, for example 100 to 300 $\mu$m, and is then passed to the first evaporator by way of a buffer vessel and a preheating tank, where the feedstock is heated to approximately 80° C. Additional chemical additives such as caustic soda may be introduced at this stage. The feedstock is then injected substantially tangentially into the first evaporator, in which the temperature and pressure conditions are preferably from 160° to 180° C. and 400 mbar vacuum to atmospheric pressure respectively. Under these conditions, water and light hydrocarbons (known as light ends, with properties similar to those of naphtha) are flashed off and condensed in the spray condenser of the evaporator and/or in an external after-condenser. These fractions generally account for between 5 to 15% of the used oil volume. The cyclonic vacuum evaporation process combined with the use of a spray condenser produces a distilled water which has a relatively low metal and other contaminant content. Light ends present in the water are then separated, and may be used as heating fuel for the re-refining process. The water may be treated in order to comply with environmental regulations and may be discharged or used as a coolant or heating fluid in the re-refining process. The bottoms product, comprising the non-distilled 85 to 95% of the used feedstock oil, is recirculated as described above. In the recirculation circuit, the bottoms product is heated, preferably to 180° to 200° C., and mixed with the primary feedstock supply for reinjection into the first evaporator. Advantageously, the pump in the recirculation circuit generates a recirculation flow rate greater than the initial feedstock flow rate. This helps to reduce coking in the recirculation pipes since overheating of the oil in the heat exchanger is avoided. The recirculation flow rate should be large enough to generate a well turbulent flow, and accordingly depends on the heat exchanger duty and on the size of the pipe lines. This is typically achieved with a recirculation flow rate 5 to 10 times greater than the initial feedstock flow rate.

A proportion of the recirculating bottoms product from the first evaporator is fed to and injected into a second evaporator. This second evaporator is substantially similar to the first evaporator, but the temperature and pressure conditions are preferably from 260° to 290° C. and 40 to 100 mbar vacuum respectively. Under these conditions, a light fuel oil (similar to atmospheric gas oil) and a spindle oil having a viscosity at 40° C. of about 15 cSt) are flashed off as overhead products, leaving behind a bottoms product from which the base oil distillate is to be recovered. These gas oil and spindle oil fractions generally account for between 6 to 20% of the original used oil volume. The condensed fractions are fed to storage and may be subjected to a finishing treatment, the severity of which will be determined by final usage and market requirements. The bottoms product of the second evaporator is recirculated as in the first evaporator, but at a temperature preferably in the region of 280° C., and a proportion of the recirculated product is fed to and injected into a third evaporator.

The third evaporator preferably operates at temperature and pressure conditions of around 290° to 330° C. and 15 to 25 mbar vacuum respectively. These operating values may be varied within predetermined limits (generally ±10%) to suit the required distillate output products. Advantageously, the third evaporator is in communication with first and second spray condensers. The second spray condenser serves to condense some of the lighter fractions from the vapour phase which passes through the first spray condenser.

Two base oil fractions are produced in the third stage as overhead distillate products and fed to storage. The first and second spray condensers, operating at elevated temperatures (100° to 250° C.) allow a partial condensation whereby two specific distillate fractions can be produced. The spray condensers have the added advantage that the temperate as well as the recirculation flow rate can be varied, thereby allowing a flexible fractionation. The viscosity of the fractions may be altered by adjusting the ratio of temperature to recirculation flow rate; by increasing the condenser temperature, a heavier oil fraction can be produced. The base oil fractions extracted by the third evaporator generally account for about 10 to 50% of the used oil volume. The bottoms product is recirculated at around 330° C. as before, and a proportion of the recirculated product is fed to and injected into a fourth evaporator.

The fourth evaporator preferably operates at temperature and pressure conditions of around 320° to 345° C. and 5 to 15 mbar vacuum respectively. Further base oil fractions, which are heavier than those extracted in the third stage, are flashed off as overhead products and are condensed as base oil distillate fractions and fed to storage. In certain embodiments, the evaporator may be operated in a blocked manner, whereby a number of discrete temperature and pressure conditions are applied in order to extract specific fractions from the feedstock. Each such fraction is preferably fed to individual storage. The base oil fractions extracted by the fourth evaporator generally account for about 10 to 50% of the original used oil volume; this depends to some extent on the general viscosity of the used feedstock oil. The remaining bottoms concentrate contains heavy metals from the used oil, and sediments, carbon particles, ash and various non-volatile oil additives. This bottoms concentrate is fed to storage and is suitable for use as a roofing flux, a cold patch material or an asphalt extender. Where environmental regulations permit, the bottoms concentrate may be used as heavy fuel oil in applications such as cement kilns, blast furnaces or incinerators. Dependent on its intended usage, the evaporator conditions may be set to produce a bottoms concentrate at viscosities ranging from 380 cSt at 40°0 C. for heavy fuel to 200 cSt at 135° C. for asphalt use.

The distillate fractions typically amount to 85–95% of the used lubricating oil, leaving 5–15% as bottoms. The base oil distillate fractions may be treated to produce finished base oils (which have viscosities of not less than 20 cSt at 40° C. and have characteristics similar to those of virgin base oils). Depending on the fractions contained in the used oil and on market requirements, the base oil fractions that are typically produced are 100 SN (solvent neutral), 150 SN, 250 SN and 350+ SN. If only one or two wider base oil fractions are required, the fourth evaporator may be omitted.

As an alternative to the multi-stage distillation plant described above, it is possible to utilise a single evaporator operating in a blocked manner. The various fractions may then be extracted sequentially by applying predetermined temperature and pressure conditions in the evaporator. This has the advantage over a multi-stage plant of requiring less capital expenditure, but is less efficient since continuous process conditions can not be achieved.

The raw base oil distillates may contain volatile contaminants, oxidation compounds, unstable sulphur compounds and various decomposition products from additives, depending on the type and quality of the feedstock. It is therefore advantageous to provide a finishing treatment in which baas and fuel oil distillates are chemically treated in order to remove unstable or other undesirable components.

The start-up and shut-down operations of the plant described above are rapid, typically requiring no more than two hours. This is significantly faster than in conventional oil refining plant.

Advantageously, a blending plant may be provided in which the various produced base oils are mixed with predetermined additives to make up the required specifications or rerefined lubricating or industrial oil. A drum filling facility may additionally be provided.

For a better understanding of the present invention, and to show how it may be carried into effect, reference will now be made, by way of example, to the accompanying drawings:

DETAILED DESCRIPTION OF THE PREFERRED EMBODIMENTS

Figure 1:
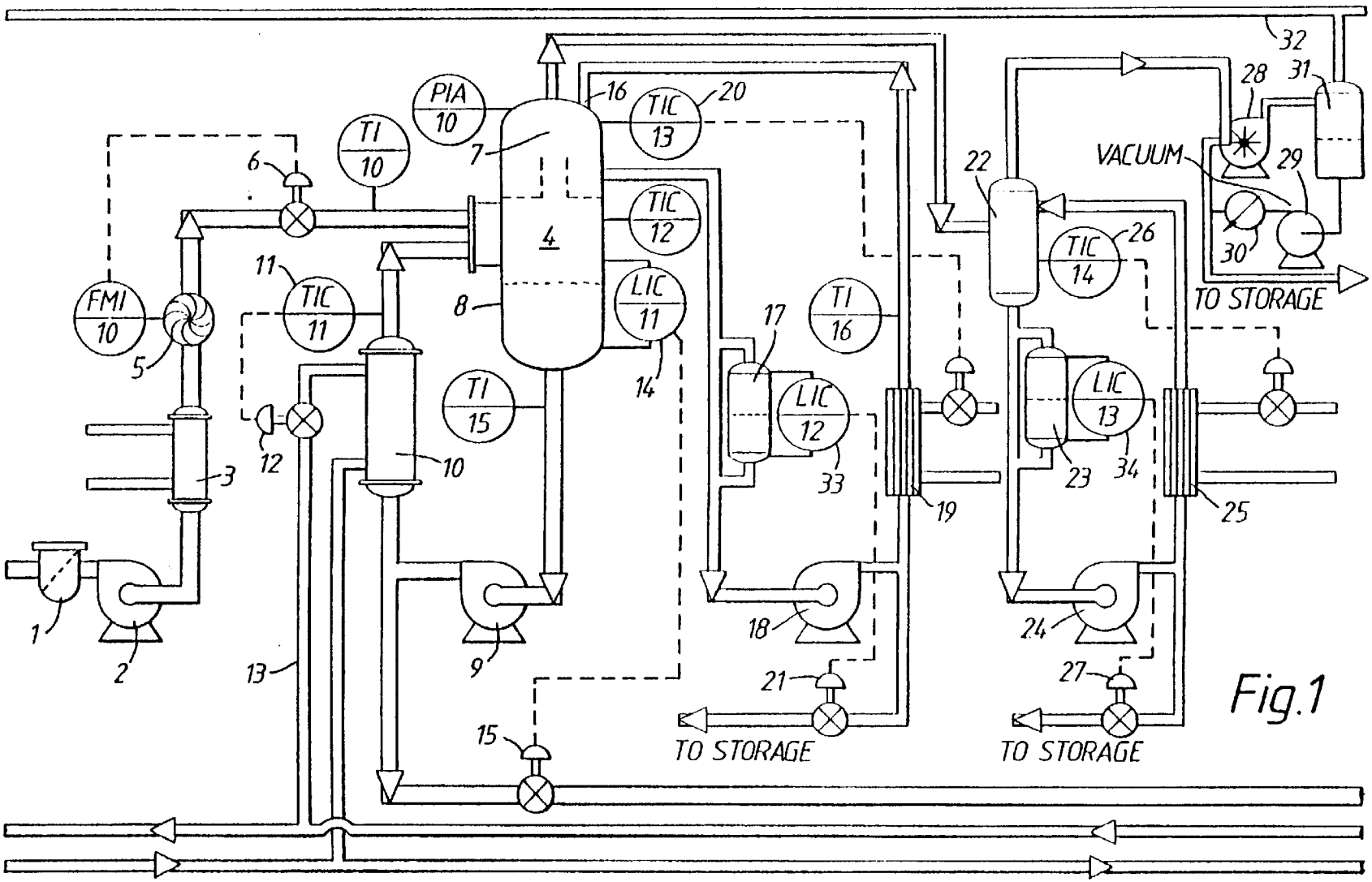
FIG. 1 is a schematic representation of an evaporator stage in a process according to the present invention.

As shown in FIG. 1, feedstock used oil passes through a filter 1 and a pump 2 before being heated to the required temperature in a heat exchanger 3, from which it then passes to the cyclonic evaporator 4 by way of a flowmeter 5 which controls a valve 6 so as to regulate the flow of feedstock. The feedstock is then tangentially injected into the evaporator 4, in which predetermined temperature and pressure conditions are applied. Since the pressure in the evaporator 4 is less than atmospheric pressure, a predetermined fraction of the feedstock will be flashed off and pass upwards through a spray condenser 7, while the remaining fractions will fall to the bottom of the evaporator to form the bottoms product 8. The bottoms product 8 is recirculated by way of a pump 9 and a heat exchanger 10 to the evaporator 4. A temperature sensor 11 controls a valve 12 in the thermal oil supply 13 to the heat exchanger 10, thereby enabling control over the temperature of the recirculating bottoms product 8. A level controller 14 in the evaporator 4 controls a valve 15 which allows a proportion of the recirculating bottoms product 8 to be passed on for further processing as the bottom of the evaporator 4 fills up.

Part of the vapour fraction evaporated from the feedstock tangentially injected into the evaporator 4 is condensed in the spray condenser 7. This distillate is recirculated to the spray head 16 by way of a holding tank 17, a pump 18 and a heat exchanger 19. The cooling water input to the heat exchanger 19 is controlled by a temperature sensor 20 connected to the spray condenser 7, thereby enabling control of the temperature in the spray condenser to be achieved. A level controller 33 in the holding tank 17 controls a valve 21 which allows a proportion of the recirculating distillate to be fed to storage.

The vapour fraction which is not condensed in the spray condenser 7 passes to a subsequent condenser 22. The liquid fraction condensed in the condenser 22 is recirculated by way of a holding tank 23, a pump 24 and a heat exchanger 25. The cooling water input to the heat exchanger 25 is controlled by a temperature sensor 26 connected to the condenser 22, thereby enabling control of the temperature in the condenser to be achieved. A level controller 34 in the holding tank 23 controls a valve 27 which allows a proportion of the recirculating distillate to be fed to storage.

The vapour fraction which is not condensed in the condenser 22 passes to a vacuum system comprising two pumps 28 and 29, a cooler 30 and a holding tank 31. The primary function of the vacuum system is to maintain the vacuum in the main evaporator 4. A distillate produced in the vacuum circuit may be fed to storage, while the remaining vapour fraction may be fed through pipe 32 for incineration.

Figure 2:
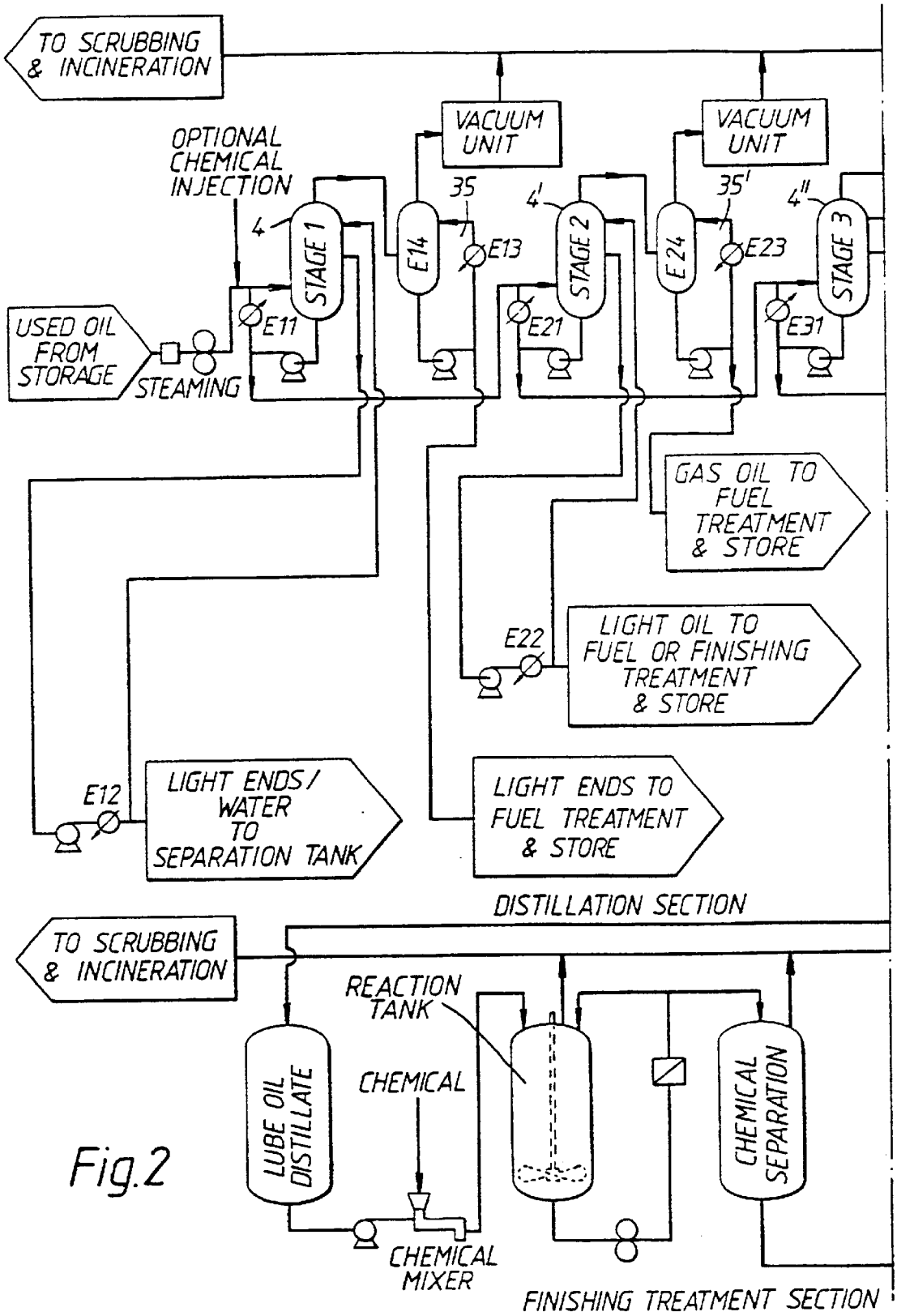
FIG. 2 is a schematic representation of the whole process.
Figure 2:
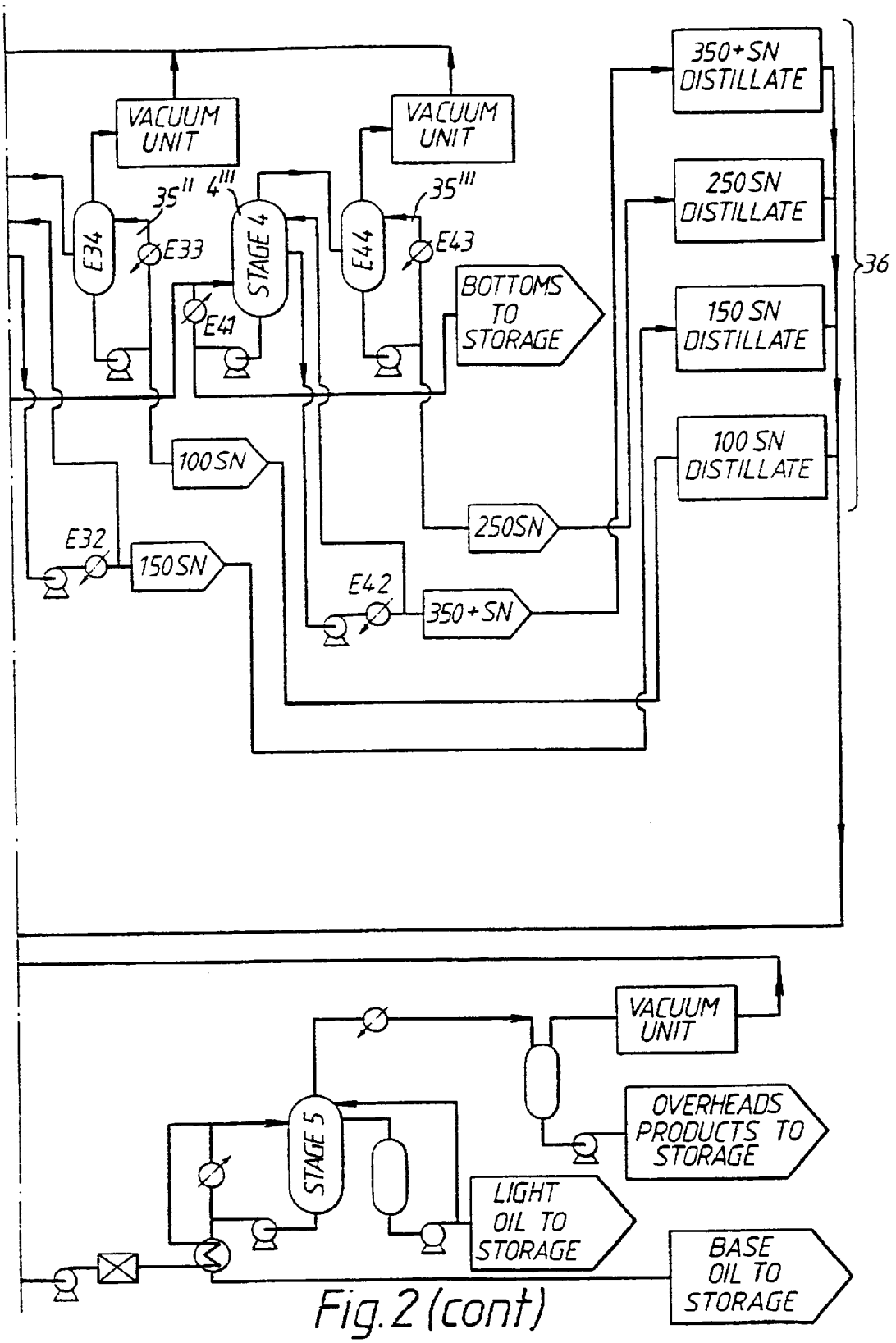

FIG. 2 shows four interconnected evaporator stages similar to that shown in FIG. 1. In the first stage, water and some light ends are obtained in the spray condenser 7, while further light ends are obtained in the secondary condensation circuit 35. The evaporator 4 of the first stage may operate at a temperature of 160° to 180° C. and a pressure of 400 mbar vacuum to atmospheric pressure. A proportion of the bottoms product of the first stage is passed on to the second stage for further processing. In the second stage, the evaporator 4' is operated at a temperature of 260° to 290° C. and a pressure of 40 to 100 mbar vacuum. Light oil and light fuel oil are condensed in the spray condenser and gas oil is condensed in the secondary condensation circuit 35'. The bottoms product of the second stage is fed to the third stage, where the evaporator 4" is operated at a temperature of 290° to 330° C. and a pressure of 15 to 25 mbar vacuum. 150 SN base oil distillate is obtained in the spray condenser and 100 SN base oil distillate in the secondary condensation circuit 35". Finally, the bottoms product of the third stage is fed to the fourth stage, where the evaporator 4'" is operated at a temperature of 320° to 345° C. and a pressure of 5 to 15 mbar vacuum. 350+ SN base oil distillate is obtained in the spray condenser and 250 SN base oil distillate in the secondary condensation circuit 35'". The various base oil distillates are stored at 36, from where they may be passed blockwise for finishing treatment.

Figure 4:
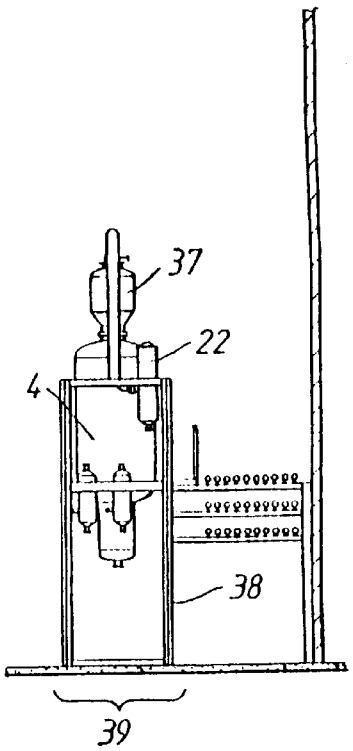
FIGS. 3 and 4 show a plant constructed from a number of modular evaporator units.
Figure 3:
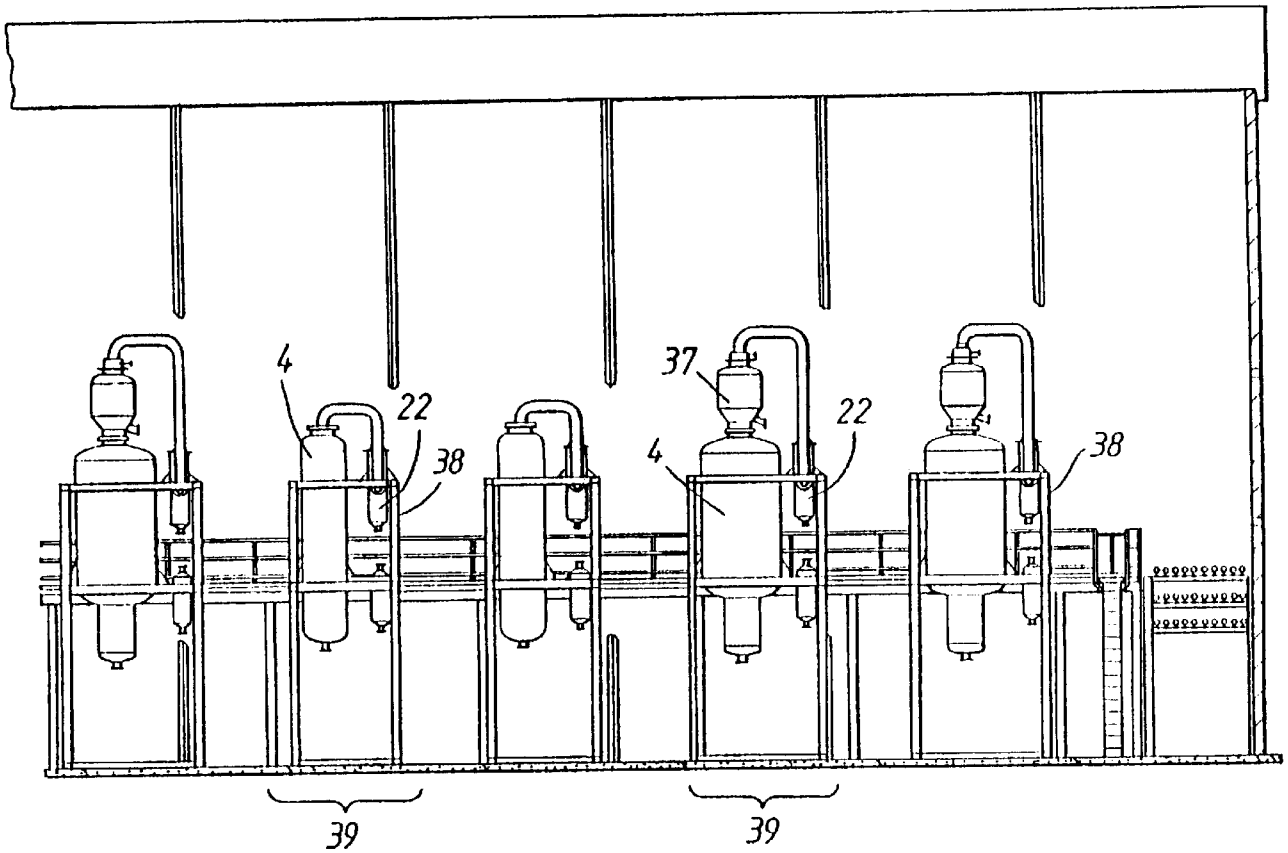

FIG. 3 shows a re-refining plant in which each evaporator 4 and its associated ancillary apparatus, such as condensers 22 and 37, is mounted in a frame 38 so as to form a modular unit, indicated generally at 39. Input and output to each modular unit is arranged so that two or more modular units may be brought together and interconnected to a straightforward manner, thereby allowing a plant to be built up quickly and simply. FIG. 4 is an end elevation of the plant of FIG. 3.

The following tables give the results, respectively, of an analysis performed on used lubricating oil, on base oil distillate produced from the used oil by an embodiment of the present invention, and on rerefined base oil to which a finishing treatment has been applied:

TABLE 1

| Sample: Used Oil | Result | Unit | Method |
|---|---|---|---|
| Chlorine | 710 | mg/kg | IP AK/81 |
| Density | 893.5 | $kg/m^3$ | NF M 60–172 |
| Metals: | | mg/kg | ICP |
| Aluminium | 16 | | |
| Antimony | 9 | | |
| Barium | 31 | | |
| Cadmium | 1 | | |
| Calcium | 2119 | | |
| Chromium | 3 | | |
| Copper | 37 | | |
| Iron | 108 | | |
| Lead | 214 | | |
| Magnesium | 274 | | |
| Manganese | 2 | | |
| Molybdenum | 4 | | |
| Nickel | 2 | | |
| Silicium | 45 | | |
| Silver | <1 | | |
| Tin | 10 | | |
| Titanium | 2 | | |
| Vanadium | 1 | | |
| Zinc | 904 | | |
| Phosphorus | 842 | mm/kg | ICP |
| Sulphur | 0.648 | mass % | ASTM D 2622 (RX) |
| TAN | 2.5 | mg KOH/g | NFT 60–112 |
| Viscosity: | | | |
| @40° C. | 71.44 | $mm^2/s$ | NFT 60–100 |
| @100° C. | 11.64 | $mm^2/s$ | NFT 60–100 |
| Water | 4.0 | mass % | NFT 60–113 |

TABLE 2

| Sample: Used Oil Distillate | Result | Unit | Method |
|---|---|---|---|
| Chlorine | 42 | mg/kg | IP AK/81 |
| Colour | <7.5 | Quotation | NF T 60–104 |
| Metals: | | mg/kg | ICP |
| Aluminium | 1 | | |
| Antimony | <1 | | |
| Barium | <1 | | |
| Cadmium | <1 | | |
| Calcium | 1 | | |
| Chromium | <1 | | |
| Copper | <1 | | |
| Iron | <1 | | |
| Lead | 1 | | |
| Magnesium | <1 | | |
| Manganese | <1 | | |
| Molybdenum | <1 | | |
| Nickel | <1 | | |
| Silicium | 8 | | |
| Silver | <1 | | |
| Tin | <1 | | |
| Titanium | <1 | | |
| Vanadium | <1 | | |
| Zinc | <1 | | |
| Nitrogen: | | | |
| Basic | 92 | mg/kg | LPMSA/718 |
| Total | 329 | mg/kg | LPMSA/652 |
| Phosphorus | 36 | mg/kg | ICP |
| Sulphur | 0.419 | mass % | ASTM D2622 (RX) |
| TAN | 0.15 | mg KOH/g | NFT 60–112 |

TABLE 2-continued

| Sample: Used Oil Distillate | Result Unit | Method |
|---|---|---|
| Viscosity: | | |
| @40° C. | 31.07 $mm^2/s$ | NFT 60–100 |
| @100° C. | 5.349 $mm^2/s$ | NFT 60–100 |
| Viscosity: | | |
| Index | 105 Quotation | NFT 60–136 |

TABLE 3

| Sample: Re-refined Base Oil | Result Unit | Method |
|---|---|---|
| Chlorine | 3 mg/kg | IP AK/81 |
| Colour | <1.5 Quotation | NF T 60–104 |
| Metals: | mg/kg | ICP |
| Aluminium | <1 | |
| Antimony | <1 | |
| Barium | <1 | |
| Cadmium | <1 | |
| Calcium | <1 | |
| Chromium | <1 | |
| Copper | <1 | |
| Iron | <1 | |
| Lead | <1 | |
| Magnesium | <1 | |
| Manganese | <1 | |
| Molybdenum | <1 | |
| Nickel | <1 | |
| Silicium | <1 | |
| Silver | <1 | |
| Tin | <1 | |
| Titanium | <1 | |
| Vanadium | <1 | |
| Zinc | <1 | |
| Nitrogen: | | |
| Basic | 10 mg/kg | LPMSA/718 |
| Total | 31 mg/kg | LPMSA/652 |
| Phosphorus | <1 mg/kg | ICP |
| Sulphur | 0.300 mass % | ASTM D2622 (RX) |
| TAN | <0.05 mg KOH/g | NFT 60–112 |
| Viscosity: | | |
| @40° C. | 29.25 $mm^2/s$ | NFT 60–100 |
| @100° C. | 5.16 $mm^2/s$ | NFT 60–100 |
| Viscosity | | |
| Index | 105 Quotation | NFT 60–136 |
| Cloud Point | −7 ° C. | NF T 60–105 |
| Conradson Carbon | | |
| Residue | <0.01 mass % | ASTM D 189 |
| Distillation (GC) | ° C. | ETS 83–001 |
| IBP | 299 | |
| 5 | 366 | |
| 10 | 385 | |
| 15 | 396 | |
| 20 | 404 | |
| 30 | 416 | |
| 40 | 426 | |
| 50 | 434 | |
| 60 | 443 | |
| 70 | 452 | |
| 80 | 463 | |
| 85 | 470 | |
| 90 | 479 | |
| 95 | 490 | |
| FBP | 521 | |

TABLE 3-continued

| Sample: Re-refined Base Oil | Result Unit | Method |
|---|---|---|
| Flash Point | | |
| COC | 218 ° C. | NFT 60–118 |
| Noack Volatility | | |
| (1 hr @ 250° C.)14.3 | mass % | NF T 60–161 |
| Oxidation Stability | | |
| (2 × 6 hrs @ 200° C.): | | IP 48 |
| Viscosity @ 40° C.: | | |
| before | 29.25 $mm^2/s$ | NF T 60–100 |
| after | 36.28 $mm^2/s$ | NF T 60–100 |
| Conradson Carbon Residue: | | |
| before | <0.01 mass % | ASTM D 189 |
| after | 0.37 mass % | ASTM D 189 |
| Pour Point | −12 ° C. | NF T 60–105 |

I claim:

[1. A method of re-refining used oil wherein the used oil is processed in at least one cyclonic vacuum evaporator comprising a substantially void evaporation chamber into which feedstock is substantially tangentially injected, and wherein a fraction of the feedstock is condensed in a spray condenser communicating with the evaporation chamber.]

[2. A method according to claim 1, wherein a portion of the feedstock is recirculated to the evaporation chamber at a higher temperature and a greater flow rate than the original feedstock by way of a recirculation circuit including a pump and a heater.]

[3. A method according to claim 2, wherein distillate obtained from the spray condenser is recirculated to the spray condenser by way of a recirculation circuit including a pump and a heater.]

[4. A method according to claim 1, wherein distillate obtained from the spray condenser is recirculated to the spray condenser by way of a recirculation circuit including a pump and a heater.]

[5. A cyclonic vacuum evaporator provided with temperature and pressure control and comprising a substantially void evaporation chamber, means for injecting feedstock substantially tangentially into said evaporation chamber, and a spray condenser in communication with said evaporation chamber in which a distillate is obtained.]

[6. An evaporator as claimed in claim 5, further comprising a feedstock recirculation circuit including a pump and a heater for recirculating the product collected at the bottom of said evaporation chamber back into said evaporating chamber.]

[7. An evaporator as claimed in claim 6, wherein the evaporator is provided with a distillate recirculating circuit including a pump and a heater.]

[8. An evaporation according to claim 6 wherein said feedstock injected into said evaporator has a first temperature and wherein said heater heats the recirculated product to a temperature higher than the temperature of the original feedstock.]

[9. An evaporator as claimed in claim 5, further comprising a distillate recirculation circuit including a pump and a heater.]

[10. A plant suitable for re-refining used oil, the plant comprising at least two cyclonic vacuum evaporators each provided with temperature and pressure control and each comprising a substantially void evaporation chamber into which, in use, feedstock is substantially tangentially injected, and each being provided with a spray condenser in communication with the evaporation chamber in which spray condenser a distillate may be collected, wherein the evaporators are linked together such that feedstock which has been processed in a first evaporator may be passed as feedstock to the at least one other evaporator for further processing.]

[11. A plant as claimed in claim 10, wherein each evaporator and its associated spray condenser comprises a modular unit mounted in a frame.]

[12. A cyclonic vacuum evaporator provided with a temperature and pressure control and comprising an evaporation chamber defining an interior space substantially void of baffles or other means to impart a cyclonic motion to the feedstock, means for injecting feedstock substantially tangentially into said evaporation chamber, and a spray condenser in communication with said evaporation chamber in which a distillate is obtained.]

*13. A method of re-fining used oil wherein the used oil is processed in at least one cyclonic vacuum evaporator, the cyclonic vacuum evaporator comprising an evaporation chamber which is substantially free of moving parts and/or labyrinthine structures, said method comprising*

(*a*) *tangentially injecting a primary feedstock into a first evaporator, the first evaporator having a temperature of from 160 to 180° C. and a pressure of from 400 mbar to atmospheric, wherein a fraction of the feedstock is condensed in a spray condenser communicating with the first evaporation chamber, and a further fraction of the feedstock is collected as a first bottoms product at a lower end of the first evaporating chamber;*

(*b*) *tangentially injecting a proportion of the first bottoms product into a second evaporator, the second evaporator having a temperature of from 260 to 290° C. and a pressure of from 40 to 100 mbar vacuum, wherein a fraction of the first bottoms product is condensed in a spray condenser communicating with the second evaporation chamber, and a further fraction of the first bottoms product is collected as a second bottoms product at a lower end of the second evaporation chamber;*

(*c*) *tangentially injecting a proportion of the second bottoms product into a third evaporator having a temperature of from 290 to 330° C. and a pressure of from 15–25±10% mbar vacuum, wherein a fraction of the second bottoms product is condensed in a spray condenser communicating with the third evaporation chamber, and a further fraction of the second bottoms product is collected as a third bottoms product at a lower end of the third evaporation chamber; and*

(*d*) *tangentially injecting a proportion of the third bottoms product into a fourth evaporator having a temperature of from 320 to 345° C. and a pressure of from 5 to 15 mbar vacuum, wherein a fraction of the third bottoms product is condensed in a spray condenser communicating with the fourth evaporation chamber, and a further fraction of the third bottoms product is collected as a fourth bottoms product at a lower end of the fourth evaporation chamber.*

*14. The method according to claim 13 wherein the cyclonic vacuum evaporators used in steps (a) to (d) are different cyclonic vacuum evaporators connected to one another in series.*

*15. The method according to claim 13 wherein the cyclonic vacuum evaporator used in steps (a) to (d) is the same evaporator operated in a blocked manner.*

*16. The method according to claim 13 wherein at least one of the bottoms products provided by steps (a) to (c) is recirculated to the evaporating chamber from which it was provided at a higher temperature and a greater flow rate than the original feedstock by way of a recirculation circuit including a pump and a heater.*

*17. The method according to claim 16 wherein the first bottoms product is heated to 180 to 200° C. and mixed with the primary feedstock supply for reinjection into the first evaporator.*

*18. The method according to claim 16 wherein the second bottoms product is heated to a temperature of about 280° C. and mixed with the first bottoms product supply for reinjection into the second evaporator.*

*19. The method according to claim 16 wherein the third bottoms product is heated to a temperature of about 330° C. and mixed with the second bottoms product supply for reinjection into the third evaporator.*

*20. The method according to claim 16 wherein the bottoms product provided by steps (a) to (c) is recirculated at a flow rate of 5 to 10 times greater than the initial feedstock flow rate.*

*21. The method according to claim 13 wherein the primary feedstock is heated to about 80° C. in a heat exchanger (3) prior to injection into the first evaporator.*

*22. A method for re-fining used-oil, comprising:*

*injecting a primary feedstock into at least two cyclonic vacuum evaporators connected in series, the evaporators comprising a substantially void evaporation chamber, a substantially tangential inlet, and a spray condenser in communication therewith,*

*passing a distillate from each of the at least two cyclonic vacuum evaporators to the spray condensers; and*

*controlling a temperature and pressure of each evaporator independently.*

*23. The method of claim 22, wherein the at least two cyclonic vacuum evaporators comprises four evaporators in series.*

*24. The method of claim 23, further comprising maintaining a higher vacuum in the third and fourth evaporators than in the first and second evaporators.*

*25. The method of claim 22, further comprising changing the temperature and pressure of at least one of the at least two evaporators to obtain an alternative oil fraction.*

*26. A method for re-fining used-oil, comprising:*

*injecting a primary feedstock into a first cyclonic vacuum evaporator having a substantially tangential inlet and a spray condenser in communication therewith, the first evaporator comprising a substantially void evaporation chamber;*

*injecting at least a portion of a bottoms product of the first evaporator into a second cyclonic vacuum evaporator having a substantially tangential inlet and a spray condenser in communication therewith, the second evaporator comprising a substantially void evaporation chamber;*

*passing a distillate from the first and the second evaporators to the spray condensers; and*

*controlling a temperature and pressure of each evaporator independently.*

*27. The method of claim 26, wherein the distillate from the spray condensers are refluxed to their respective evaporator.*

*28. The method of claim 26, wherein the first and second cyclonic vacuum evaporators are connected in series.*

*29. The method of claim 26, further comprising injecting at least a portion of a bottoms product of the second*

*evaporator into a third cyclonic vacuum evaporator having a substantially tangential inlet and a spray condenser in communication therewith.*

*30. The method of claim 29, further comprising injecting at least a portion of a bottoms product of the third evaporator into a fourth cyclonic vacuum evaporator having a substantially tangential inlet and a spray condenser in communication therewith.*

* * * * *